United States Patent [19]

Schenk

[11] Patent Number: 5,681,454
[45] Date of Patent: Oct. 28, 1997

[54] LIQUID PROCESSING PLANT

[75] Inventor: Rudolf Schenk, Unterentfelden, Switzerland

[73] Assignee: Urs Jager, Niederlanz, Switzerland

[21] Appl. No.: 177,286

[22] Filed: Jan. 4, 1994

[30] Foreign Application Priority Data

Jan. 13, 1993 [DE] Germany .................. 43 00 585.3

[51] Int. Cl.⁶ .................................................. B01D 27/10
[52] U.S. Cl. .................................. 210/132; 210/284
[58] Field of Search ........................ 210/90, 130, 264, 210/284, 132

[56] References Cited

U.S. PATENT DOCUMENTS 3,883,430  5/1975  Codo ........................... 210/132
4,090,963  5/1978  Grout .......................... 210/130
4,383,920  5/1983  Muller et al. ................. 210/284

FOREIGN PATENT DOCUMENTS 2-149306  7/1990  Japan ......................... 210/132

Primary Examiner—Ivars Cintins
Attorney, Agent, or Firm—Tarolli, Sundheim, Covell, Tummino & Szabo

[57] ABSTRACT

The liquid processing plant, comprises: an inlet; an outlet; a plurality of liquid treatment apparatuses arranged in parallel between said inlet and said outlet, one of them being directly connected to said inlet and said outlet and the remainder of said plurality of liquid treatment apparatuses being connected to said inlet via a valve assembly having an inlet and an outlet and including a pressure relief valve means; each of said valve assemblies opening on a different pressure.

10 Claims, 3 Drawing Sheets

5,681,454

LIQUID PROCESSING PLANT

FIELD OF THE INVENTION

The invention refers to liquid processing plants and to valve assemblies, particularly for use in such liquid processing plants.

BACKGROUND OF THE INVENTION

Apparatuses for processing liquids, particularly for processing water, are known in the art, and include, e.g., apparatuses for softening, degerminating or filtering such liquids. Apparatuses for enriching such liquids with additives, e.g. for enriching water with minerals, are known as well. Also, for processing water for special purposes, e.g. processing brewing water, or ozonization of water, a great variety of further apparatuses are known.

There are some principal problems in plants having important periodical variations of the throughput, such as domestic water supply plants. These problems will be explained hereafter on the basis of the example of softening water by partially or totally deactivating the lime contained in said water. The purpose of such water softening generally is to avoid the forming of limestone on the walls of the water conduits, and particularly in the hot-water apparatus, and to reduce the deposition of lime in the domestic appliances connected to such a water processing plant.

Today, water softening apparatuses are often used in domestic water supply plants as locally active units. They are generally known as "deliming apparatuses". Such deliming apparatuses are designed to process defined rated quantities of water, and generally are interposed into the main water conduit.

At a working point corresponding to the rated quantity, the deliming apparatus is flown through at a specified flow velocity. In order to have a good efficiency, this velocity should be observed as close as possible. If the flow velocity of the water is much higher or lower, the efficiency of the deliming apparatus is considerably reduced. In order to avoid an undue pressure drop at a high or at the maximum water consumption, the rated quantity of the apparatus is to be close to the maximum through flow, i.e. the maximum water consumption. However, such a dimensioning of the deliming apparatus means that it is flown through for the major part of time by a quantity of water which is only a fraction of the rated quantity, since in a household very often only a few water consumers are simultaneously active. Thus, for the major part of time, the flow through velocity of the water is far below low the rated flow through velocity, the deliming apparatus is working with a very poor efficiency, and the degree of deactivation of the lime present in the water is far below the actual possibilities and expectations. The same problems arise, in analogous form, in more or less all processes of physical or chemical treatment of liquids.

For avoiding the above mentioned disadvantages, known plants often provide a solution in which an electronic flow meter is installed upstream or downstream of said liquid processing apparatus. Said electronic flow meter is connected to an evaluation device which opens or closes a valve, e.g. a magnetic valve, at an predetermined limiting value. However, such solutions have the disadvantage that an electric voltage is present in the immediate vicinity of the liquid. Since such an apparatus is often run for decades without a periodical maintenance, and since moreover many liquids, particularly water, are relatively good conductors of electric currents, such plants present a latent hazard which should not be underestimated. A further disadvantage of such solutions is that they are very large-scale and thus very expensive.

OBJECT OF THE INVENTION

It is a primary object of the present invention to provide a liquid processing plant which eliminates the disadvantages of the prior art described above.

It is a further object of the invention to provide a liquid processing plant which, while using simple means, secures a liquid flow which is close to the optimum working conditions and thus with a high efficiency, even if the liquid consumption per period of time varies within wide limits.

It is a further object of the invention to provide such liquid processing plants for the treatment of water, and particularly for deliming water.

It is a still further object of the invention to provide a new type of valve assembly which is particularly suitable for use in liquid processing plants according to the present invention.

SUMMARY OF THE INVENTION

To meet these and other objects, the present invention provides a liquid processing plant, comprising:

an inlet;

an outlet;

a plurality of liquid treatment apparatuses arranged in parallel between said inlet and said outlet, one of them being directly connected to said inlet and said outlet, and the remainder of said plurality of liquid treatment apparatuses being connected to said inlet via a valve assembly having an inlet and an outlet, and including a pressure relief valve means;

each of said valve assemblies opening on a different pressure.

The liquid treatment apparatuses of said liquid processing plant can be of the same kind or of different kinds, i.e. doing the same type of liquid treatment, or alternatively doing different types of liquid treatment.

Also, they can all be of the same rated quantity or of different rated quantities. Since said valve assemblies are opening on different pressures, they will open the inlet to as many of the plurality of liquid treatment apparatuses as is necessary for letting each of them work close to its optimum working point. Of course, this also considerably improves the total efficiency of the liquid treatment plant. This is particularly important for domestic water plants which are working within extremely wide limits of water consumption.

In plants comprising a plurality of valve assemblies, all of them can be connected to the inlet of one liquid treatment apparatus each (as explained hereafter with reference to FIG. 1), or alternatively at least one of them can be connected to the outlet of another valve assembly (as explained hereafter with reference to FIG. 2).

Furthermore, the present invention provides a valve assembly comprising:

a housing comprising an inlet chamber and an outlet chamber;

a valve seat arranged between said inlet chamber and said outlet chamber;

a valve body member for closing said valve seat actuated by a spring member;

means for adjusting the initial pretension force of said spring member;

said valve body member being movable against said initial pretension force of said spring member Under the action of the differential pressure existing between said inlet chamber and said outlet chamber.

This valve assembly is particularly useful for use in liquid processing plants according to the present invention. However, their use is not limited to said purpose.

BRIEF DESCRIPTION OF THE DRAWINGS

In the following, some embodiments of the invention are further described, by way of examples, with reference to the attached drawings, in which.

DETAILED DESCRIPTION OF PREFERRED EMBODIMENTS

Figure 1:
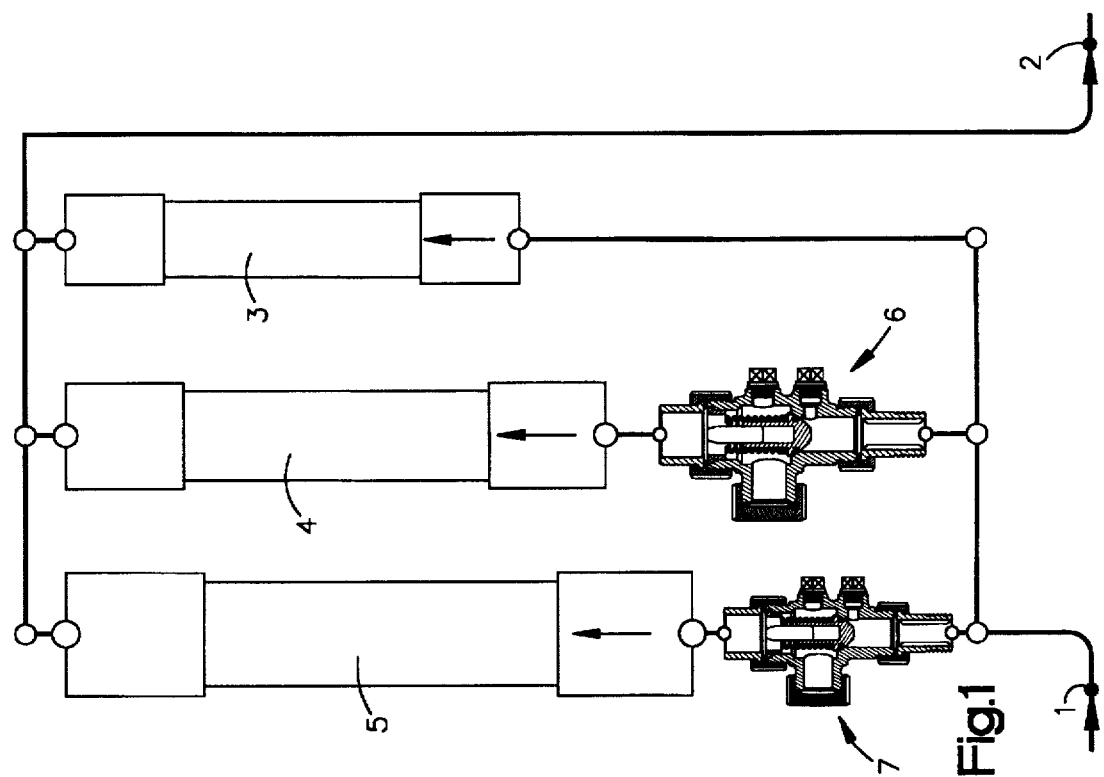
FIG. 1 shows a first embodiment of an liquid treatment plant according to the invention.

FIG. 1 schematically shows a first embodiment of the liquid processing plant according to the invention, comprising three arranged water processing apparatuses 3, 4, 5, arranged in parallel, and being of different rated quantities. It goes without saying that water processing appartuses of the same rated quantity and/or another number of water processing apparatuses can be used. Thus, the water processing apparatuses may all have the same cross-section, or may each have different cross-sections. Said water processing apparatuses 3, 4, 5 can e.g. be deliming apparatuses for softening water. Two of said water processing apparatuses 4, 5 are connected in series each to one of the valve assemblies 6, 7. As is shown more in detail in FIG. 3, said valve assemblies 6, 7 comprise a housing which in turn comprises an inlet chamber 14 and an outlet chamber 15. A valve seat 17 is arranged between said inlet chamber 14 and said outlet chamber 15. Said valve seat is closeable by means of a valve body member 19 which is pretensioned by a helical spring 18, said valve body member 19 being moveable under the action of a predeterminable differential pressure existing between the inlet 1, or the inlet chamber 4, respectively, and the outlet 2, or the outlet chamber 15, respectively, against the pretension force of the spring member 18. The valve body members 19 of the valve assemblies 6, 7 are pretensioned by different forces.

The functioning of said liquid processing plant is as follows:

The liquid treatment apparatus 3 is of a defined rated quantity and thus of a defined cross section. If the valve assemblies 6 and 7 are closed, said cross section is proportional to a given quantity of liquid flowing, per unit of time, through said liquid treatment apparatus 3, and thus is decisive for the pressure drop between the inlet and the outlet of said apparatus. At the same time, this pressure drop is proportional to the pressure drop between the inlet 1 and the outlet 2 of the liquid treatment plant. As long as the force exerted by the differential pressure of the liquid onto the inlet side of the valve body member 19 of said valve assembly 6 is smaller than the pretension force of the spring member 18, the valve body member 19 leans on the valve seat 17, so that the valve assembly 6 is closed.

Now, if the liquid consumption increases, the pressure drop in the liquid treatment plant 3 increases as well, thus creating an analogous pressure difference between the inlet 1 and the outlet 2 of the plant. This pressure difference also continually increases with the force exerted by the liquid at the inlet side of the valve assembly 6 onto said valve body member 19. Then, if a predetermined limiting pressure value is reached, the valve body member 19 is moved against the pretension force of the spring member 18, thus clearing a further conduit with respect to the liquid treatment apparatus 3. This means that on reaching a predetermined flow through quantity, and thus on reaching a predetermined pressure drop in the liquid treatment apparatus 3, the valve assembly 6 opens, so that parallelly to said liquid treatment apparatus 3 the liquid treatment apparatus 4 is flown through by the liquid.

Now, if the liquid consumption further increases, the pressure difference between the inlet 1 and the outlet 2 of the plant further increases as well. Thus, from a predetermined liquid consumption on, the valve assembly 7 opens, allowing the liquid treatment apparatus 5 to be flown through by the liquid as well.

A plant designed as described above has the important advantage that, independently from the liquid consumption, a good efficiency is ensured, since the rated quantities of each of the liquid treatment apparatuses 3, 4, 5 and the operating forces of each of the valve assemblies 6, 7 can be individually adjusted to the characteristics of the respective plant. The embodiment described here is particularly suitable for domestic water treatment plants as well, since in such domestic water treatment plants, e.g. during the night, only one of dozens of water consumers is in action.

Obviously, the embodiment described above is not exclusive. In plants in which for a large part of the working period the liquid consumption does not fall below a predetermined value, such as in manufacturing plants, the water treatment apparatus which is directly connected to the supply conduit can be dimensioned for a rated quantity corresponding on such standard consumption. Thus, the remainder of the water treatment apparatuses only serve to meet any peak consumptions. Such a plant ensures a high efficiency from medium to high liquid consumptions.

Figure 2:
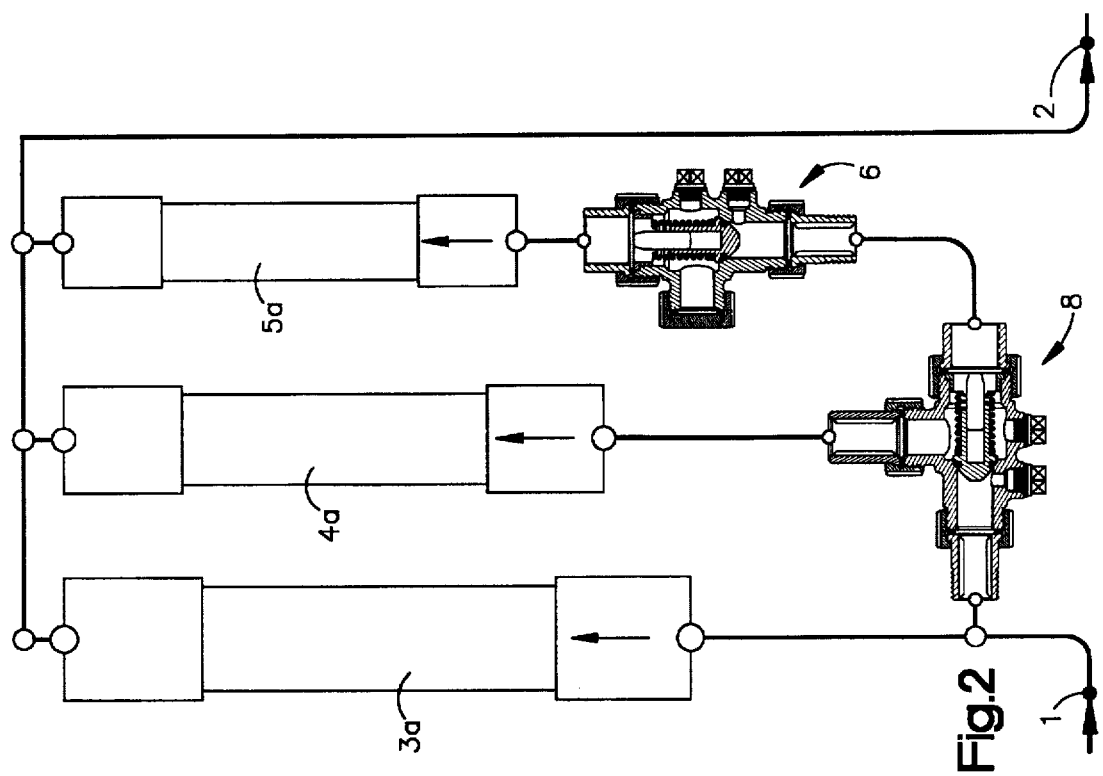
FIG. 2 shows a second embodiment of an liquid treatment plant according to the invention.

A further embodiment of a liquid processing plant is shown in FIG. 2. Again, this liquid processing plant comprises three liquid processing apparatuses 3a, 4a, 5a connected in parallel, and two valve assemblies 6, 8 connected in series. It differs from the embodiment shown in FIG. 1 essentially by the fact that one of the valve assemblies 6 is connected to the outlet of the other valve assembly 8, and that the liquid treatment apparatus 3a having the largest cross section is directly connected to the inlet 1 of the liquid treatment plant. If the valve assemblies are arranged in this way, the set pressures of all said valve assemblies can be identical. Generally, the pressure difference for opening the downstream valve assembly 6 is about the double of the pressure difference necessary for opening the upstream valve assembly 8.

Figure 3:
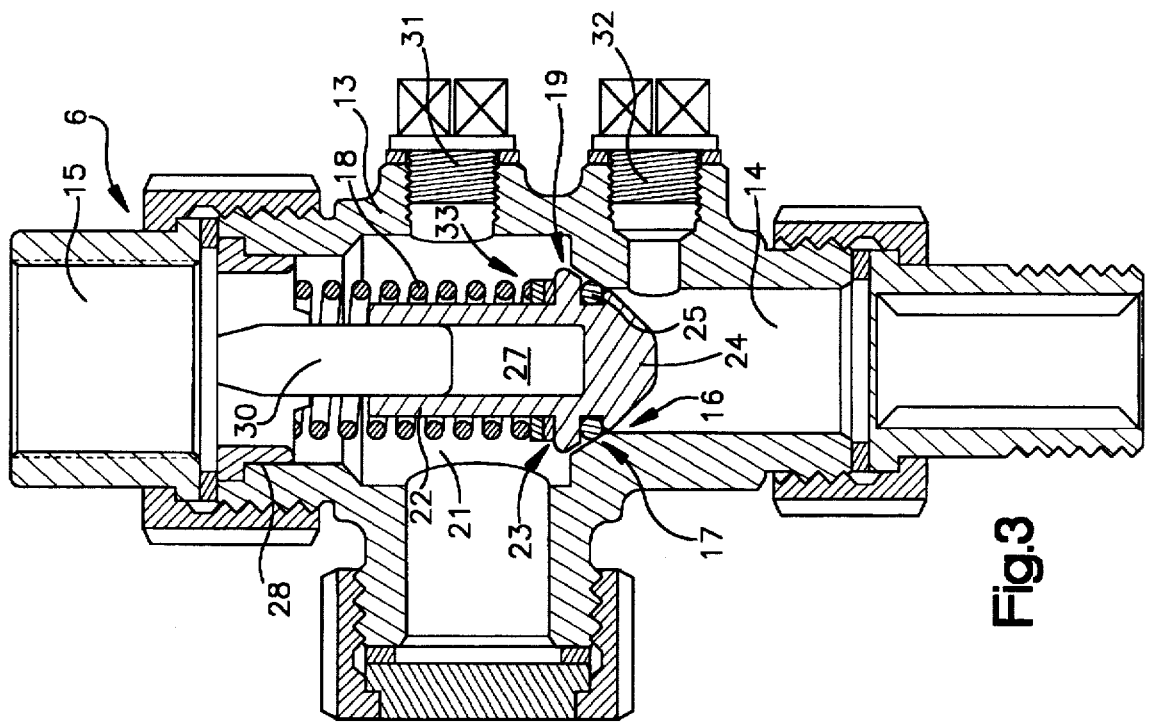
FIG. 3 is a longitudinal section of a first embodiment of a valve assembly which is suitable for use in liquid treatment plants according to the invention.

FIG. 3 is a longitudinal section of an embodiment of a valve assembly 6 used in a liquid treatment plant according to the invention. As already said above, the valve assembly 6 essentially comprises a housing 13 having an inlet chamber 14 and an outlet chamber 15, and a valve body member 19 which is pretensioned by a spring member 18, said spring member 18 pushing said valve body member 19 against a valve seat 17. A valve chamber 21 is provided between said inlet chamber 14 and said outlet chamber 15, the diameter of said valve chamber 21 being larger than the diameter of said inlet chamber 14. The transition portion between said inlet chamber 14 and said valve chamber 21 is skewed, forming said valve seat 17. The valve body member 19 comprises an essentially cylindrical rear portion 22 facing said outlet chamber 15, and a front portion 24 facing said inlet chamber 14 and having a circumferential sealing member, the diameter of said valve chamber 21 being crownedly decreasing. A blind bore 27 is embedded in the rear portion 22 of said valve body member 19. An insert 28 is embedded in the housing 13 in the region of said outlet chamber 15. Said insert 28 comprises a protrusion 30. Said protrusion 30 protrudes in the direction of said inlet chamber 14, corresponds with said blind bore 27 of the valve body member 19 with respect to position and diameter, and serves as a guide and a stopper for said moveable valve body member 19. Furthermore, said valve assembly 6 comprises two measuring plugs 31, 32 which radially extend from the longitudinal extension of said valve assembly 6, one of the measuring plugs 32 extending from said inlet chamber 4 and the other measuring plug 31 extending from the valve chamber 21 outwardly through the wall of said housing 13. The spring member 18 is clamped between a radial base plane 23 of said valve body member 19 and said insert 28. A number of spring pretensioning washers 33 of different thickness are inserted between said radial base plane 23 and said spring member 18 for varying the pretension force of said spring member 18.

The functioning of such valve assemblies is sufficiently known to those skilled in the art, and is not described here in detail. Since the length of the helical spring 18 shown in FIG. 3 is several times the diameter of said valve body member 19, a linear increase of the spring force is obtained upon displacement of said valve body member 19, thus clearing a larger passage 16 when the pressure difference increases. Additionally, this effect is promoted if the valve chamber 21 is enlarged as compared with said inlet chamber 14.

Figure 4:
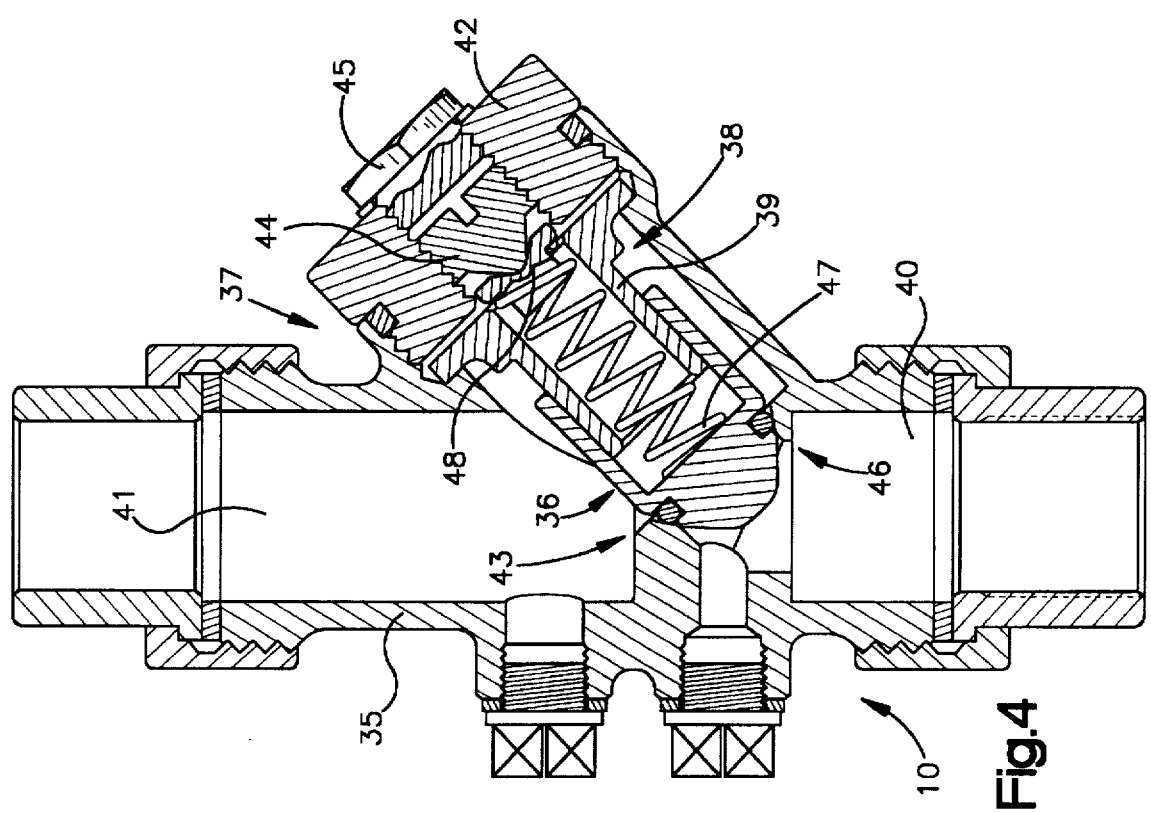
FIG. 4 is a longitudinal section of a second embodiment of a valve assembly which is suitable for use in liquid treatment plants according to the invention.

FIG. 4 is a longitudinal section of a second embodiment of a valve assembly 10. Since this embodiment of the valve assembly 10, in its functioning, to a great extent is identical with the embodiment of FIG. 3, only the essential differences will be discussed here. Again, the valve assembly comprises an inlet chamber 40, an outlet chamber 41, and a valve body member 36 closing the passage 43 with a predetermined force. The main difference of this embodiment, as compared with the preceding one, is that the valve body member inserted into the housing 35 is inclined with respect to the longitudinal axis of said housing 35. For this purpose said housing 35 is provided with a housing portion 37 which is inclined with respect to the longitudinal extension of said valve assembly 10. An insert 38 is provided in said housing portion 37, and a cylindrical protrusion 39 extends from said insert 38 in the direction of the inlet chamber 40. Said valve body member has a rounded front portion, and a cylindrical rear portion provided with a blind bore. This blind bore is designed for corresponding with the protrusion 39, so that the valve body member 36 is guided on said protrusion 39. The position of said insert 38 is fixed by the cap 42 screwed into said housing portion 37. Said cap 42 comprises a threaded central bore, a threaded pin 44 being screwed into said threaded central bore. Inside, the valve assembly 10 is provided with a collar 43 adjacent to said inlet chamber 40. This collar 43 forms a restriction for the through flowing medium, and comprises a chamfered edge serving as a valve seat 46, and corresponding to said valve body member 36.

The valve body member 36 is pressed against said valve seat 46 by a pretensioned spring member 47. Said spring member 47 is clamped between the bottom of said blind bore of said valve body member 36 and said threaded pin 44. A transmission member 48 is inserted between said threaded pin 44 and said spring member 47, in order to secure a safe force transmission between said threaded pin 44 and said spring member 47. It is one of the advantages of such this design of the valve assembly 10 that the pretension force of said spring member 47 can be adjusted from the exterior by means of said threaded pin 44. In order to prevent an involuntary moving of said threaded pin 44, a cap 45 is additionally screwed into the thread.

Figure 5:
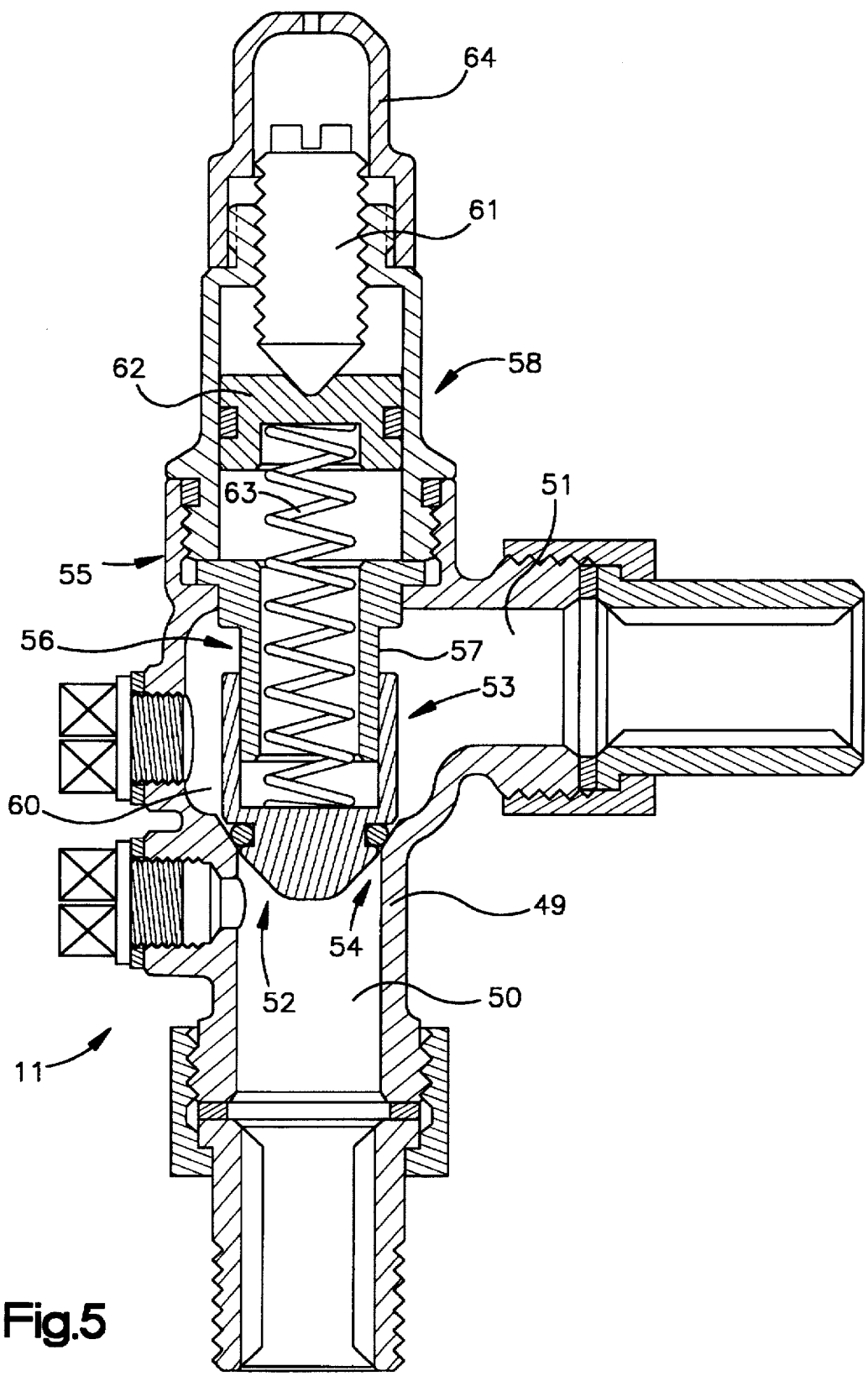
FIG. 5 is a longitudinal section of a third embodiment of a valve assembly which is suitable for use in liquid treatment plants according to the invention.

FIG. 5 shows a third embodiment of a valve assembly 11, again comprising an inlet chamber 50, an outlet chamber 51, and a passage 52 which can be closed by means of a valve body member 53. The main difference of this embodiment, as compared with the two preceding ones, is that the outlet chamber 51 is inclined with respect to said inlet chamber 52 by an angle of 90°. The housing 49 comprises a housing portion 55 aligned with said inlet chamber 50 and provided with an internal screw thread. Inserted into this housing portion 55 is an insert 56 having a cylindrical protrusion 57 extending in the direction of the inlet chamber 50. The position of said insert 56 is fixed by the front of a dome member 58 screwed into the thread of said housing portion 55. The inlet chamber 50 and the outlet chamber 51 are provided with a valve chamber 60 which is slightly wider than the adjacent chambers 50, 51, a valve seat being formed at the transition portion between said inlet chamber 50 and said valve chamber 50 by a circumferential chamfered edge 54. Said valve body member 53 has a rounded front portion and a cylindrical rear portion provided with a blind bore. The form of said protrusion 57 of the insert 56 corresponds to the blind bore of the valve body member 53 and serves for guiding the latter. At its rear side, said dome member 58 is provided with a thread, a threaded pin 61 being screwed into said thread which pretensions a spring member 63 via a disc washer 62 inserted between the bottom of said blind bore and said disc washer 62. Thereby, said body member 53 is pressed against said valve seat 54. A cap 64 is screwed onto said dome member 58 in order to protect the pretensioning force of said spring member against involuntary adjustment.

Obviously, the valve assemblies shown in FIGS. 3 to 5 can be provided with a plurality of outlets, as it is schematically shown in FIG. 2, and/or they can be provided with a plurality inlets.

What is claimed is:

1. A liquid processing plant for the treatment of liquid, comprising:

an inlet;

an outlet;

a first liquid treatment apparatus comprising a first water softener;

a second liquid treatment apparatus comprising a second water softener;

a valve assembly;

said first water softener being connected directly to said inlet;

said second water softener being connected in line with said valve assembly and said second water softener together with said valve assembly being connected to said inlet;

said valve assembly including a pressure relief valve means actuated by the liquid to be treated to open on a predetermined liquid pressure;

a first conduit for directing fluid from said first water softener to said outlet; and a second conduit for directing fluid from said second water softener and said valve assembly to said outlet, said first conduit being separate from said second conduit such that the fluid being directed through said first conduit is isolated from the fluid being directed through said second conduit.

2. A liquid processing plant for the treatment of liquid according to claim 1, wherein said liquid treating apparatuses have different cross sections to provide for different flow rates.

3. A liquid processing plant for the treatment of liquid according to claim 1, wherein all of said liquid treating apparatuses have the same cross-section.

4. A liquid processing plant for treatment of liquid according to claim 1, wherein said valve assembly comprises:
- a housing comprising an inlet chamber and an outlet chamber;
- a valve seat arranged between said inlet chamber and said outlet chamber;
- a valve body member for closing said valve seat actuated by a spring member;
- means for adjusting the initial pretension force of said spring member;
- said valve body member being movable against said initial pretension force of said spring member under the action of the differential pressure existing between said inlet chamber and said outlet chamber;
- said valve body member comprising an essentially cylindrical rear portion facing said outlet chamber and a front portion facing said inlet chamber, the diameter of said front portion being crownedly decreasing; and
- said valve body member having a radial base plane arranged between said front portion and said rear portion.

5. A liquid processing plant for the treatment of liquid, comprising:
- an inlet;
- an outlet;
- a first liquid treatment apparatus comprising a first water softener;
- a group of second liquid treatment apparatuses comprising a group of second water softeners;
- a group of valve assemblies;
- the number of water softeners contained in said group of second water softeners being equal to the number of valve assemblies contained in said group of said valve assemblies;
- said first water softener being connected directly to said inlet;
- each one of said second water softeners of said group being connected in line with one of said valve assemblies of said group;
- each of said second water softeners of said group together with said valve assembly connected thereto being connected to said inlet;
- each of said valve assemblies including a pressure relief valve means adapted to be actuated by the liquid to be treated and to open on a predetermined liquid pressure;
- a first conduit for directing fluid from said first water softener to said outlet; and
- a group of second conduits for directing fluid from said group of second water softeners and said group of valve assemblies to said outlet, each one of said second water softeners and said valve assemblies being connected with one of said second conduits of said group, said first conduit and said second conduits all being separated from each other such that the fluid being directed through each said conduit is separate from each other said conduit.

6. A liquid processing plant for the treatment of liquid according to claim 5, wherein said liquid treating apparatuses have different cross sections to provide for different flow rates.

7. A liquid processing plant for the treatment of liquid according to claim 5, wherein all of said liquid treating apparatuses halve the same cross-section.

8. A liquid processing plant for the treatment of liquid, comprising:
- an inlet;
- an outlet;
- a first liquid treatment apparatus comprising a first water softener;
- a group of second liquid treatment apparatuses comprising a group of second water softeners;
- a group of valve assemblies;
- the number of water softeners contained in said group of second water softeners being equal to the number of valve assemblies contained in said group of said valve assemblies;
- said first water softener being connected directly to said inlet;
- a first of said valve assemblies being connected to said inlet of the plant and all of said valve assemblies being connected in series;
- each of said second water softeners of said group being connected in line with a particular outlet of one of said group of valve assemblies;
- each of said valve assemblies including a pressure relief valve means adapted to be actuated by the liquid to be treated and to open on a predetermined liquid pressure;
- a first conduit for directing fluid from said first water softener to said outlet; and
- a group of second conduits for directing fluid from said group of second water softeners and said group of valve assemblies to said outlet, each one of said second water softeners and said valve assemblies being connected with one of said second conduits of said group, said first conduit and said second conduits all being separated from each other such that the fluid being directed through each said conduit is separate from each other said conduit.

9. A liquid processing plant for the treatment of liquid according to claim 8, wherein said liquid treating apparatuses have different cross sections to provide for different flow rates.

10. A liquid processing plant for the treatment of liquid according to claim 8, wherein all of said liquid treating apparatuses have the same cross-section.

* * * * *